June 2, 1964     A. CZARNECKI     3,135,860

BUILT-IN THERMOSTATIC CONTROLS FOR IMMERSION HEATING ELEMENTS

Filed April 17, 1963

INVENTOR
AUGUST CZARNECKI
By Frederick E. Bromley
ATTY.

United States Patent Office

3,135,860
Patented June 2, 1964

3,135,860
BUILT-IN THERMOSTATIC CONTROLS FOR
IMMERSION HEATING ELEMENTS
August Czarnecki, 83 Southampton Drive,
Scarborough, Ontario, Canada
Filed Apr. 17, 1963, Ser. No. 273,725
4 Claims. (Cl. 219—441)

This invention relates to electrical heating elements for the heating of liquids by immersion therein, and more particularly to electrical heating elements having thermostatic control means integrally incorporated therein for immersion in liquid therewith.

Electrical elements intended for immersion heating of domestic water boilers, percolators, electric kettles and the like are commonly supplied with thermostatic controls located in close proximity to the body of liquid being heated (to ensure rapid response to temperature changes thereof) but exteriorly thereof to minimize problems of leakproofing and corrosion protection and to permit ready readjustment in view of the tendency of some thermostatic control devices to malfunction due to vibration, ageing, etc.

Despite such contemporary attempts to isolate the thermostatic control device from the body of liquid wherein the associated heating element is immersed, it nevertheless has been found that excessive humidity is invariably encountered at the location of the thermostatic control with resultant corrosion problems. Moreover such attempts to isolate the heating element from its associated thermostatic control device naturally render the control less sensitive to variations in temperature of the liquid whose temperature is being monitored thereby, but also necessarily tend to increase the inherent delay in response to thermal fluctuations exhibited by such controls; besides which such separation of the thermostat and heating element results in an unnecessarily complicated assembly.

The inventor, however, considers that lack of leakproofing is not the primary reason for the presence of humidity, but rather that such humidity apparently arises from evaporation of moisture from the ambient air due to the relatively high temperature in the vicinity of the thermostat (which is generally of bimetallic type) and subsequent condensation of such moisture on the adjacent structure of the thermostat. Inventor, therefore, feels that undue emphasis has hitherto been placed on attempting to segregate the thermostatic control to the exerior of the body of water undergoing heating by the immersion element, and that any assumed advantages in so doing are more than counteracted by the resulting time-lag in responding to temperature fluctuations, the remoteness from the body of water whose temperature is to be accurately monitored, and the uneconomical construction as due to employment of separate mounts, terminals, and casing structures for the thermostat and its associated heating element respectively.

A further disadvantage of contemporary immersion heating elements, particularly those utilized in electric kettles and like vessels, has been their tendency to employ at least partial embedment of the heating element within the base of such vessel. This practice of embedment of the heating element is currently favoured to provide not only support for the heating element, combined with large heat transfer surface between the element and the water, but also to provide a modicum of corrosion protection for the element. Unfortunately although such embedment of the heating element undoubtedly produces a robust construction it is somewhat expensive to manufacture and allows heat transfer to the water from only one side of the heating element rather than from all sides.

Accordingly it is an object of the invention to evolve an extremely economical immersion heating element with built-in thermostatic control and supportable as a unit within a vessel without embedment in the base thereof.

It is likewise an object of the invention to provide a submersible thermostatic control structure suitable for incorporation into immersion heater elements as a unitary portion thereof.

It is a further object of the invention to provide a durable thermostatic control device capable of sustained immersion at elevated temperatures without requiring periodic readjustment.

It is also an object of the invention to provide a submersible thermostatic control structure of small volume whereby any air entrapped therein during manufacture contains insufficient moisture to cause appreciable corrosion.

It is particularly an object of the invention to provide a unitary heating element and thermostatic control assembly amenable to mass-production techniques by automated machinery employing a minimum of welding, etc. operations for optimum economic advantage.

Briefly the invention resides in providing a heating element of "butterfly" configuration (namely having the form of the letter S or the figure 8) to provide good heat-transfer to the water and enhance the rigidity of said element. The thermostatic control is housed in an extension of one end of said element and supported on a pillar encasing an incoming lead. This pillar and the remaining lead comprising the other end of said element are fastened to the base of the vessel in one operation and constitute the sole support means necessary for said element.

For a more comprehensive appreciation of the aims and objects of the invention, reference should be made to the ensuing description and drawings in which.

Figure 1:
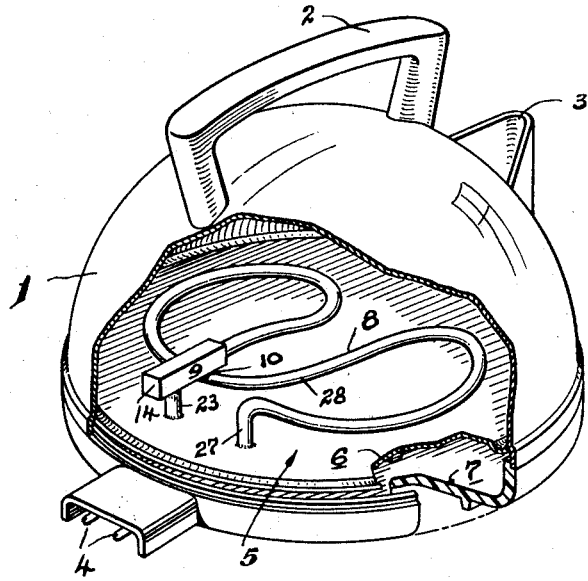
FIG. 1 is a partially sectioned perspective view of an electric kettle employing an immersion heating-element of "butterfly" configuration with built-in thermostatic control unit.

While this invention will be illustrated and described with reference to an electric kettle as shown in FIG. 1 it will be appreciated that the construction is by no means limited to such use but may be applied to other types of domestic appliance such as percolators, boilers, immersion heaters and the like where a robust, reliable and economical construction is desirable. It will also be apparent that with suitable modifications this heating element with integral thermostat control may find ready application in other than the domestic heating of water.

Referring now to the drawings; FIG. 1 illustrates a vessel 1 in the form of an electric kettle having a carrying handle 2, a filling and pouring spout 3, electrical input terminals 4 and similar conventional equipment. A water compartment 5 is defined between vessel 1 and the base 6 thereof, also in conventional manner. A false bottom 7 of plastic or similar thermally and electrically insulative material is customarily detachably secured at the underside of the kettle for housing of incoming leads from input terminals 4 to the heating element 8. Heating element 8 is of the familiar Calrod construction common to such applications, comprising a central resistive conductor 8a spaced from a concentric copper sheath 8b by packed granular magnesium-oxide insulation as evident from FIG. 2.

It will be noted that the electric kettle as thus far described in the above paragraph is representative of those presently commercially available. Such contemporary kettles generally rely on some form of thermostatic control to switch off the heating element if the kettle is accidentally allowed to boil dry. Invariably such thermostatic control is housed between the actual base 6 of the water compartment 5 and the false bottom 7 of the kettle, in order to be neatly out of the way of possible damage. However as hereinbefore observed, such location is highly undesirable in view of the relatively large volume of such an enclosure. Moreover this enclosure formed between the base 6 of the water compartment 5 and the false-bottom 7 is by no means airtight, whereby ingress of humid air is continually taking place to accelerate deterioration of the conventionally mounted thermostatic control due to corrosion as hereinbefore explained.

Figures 2, 3:
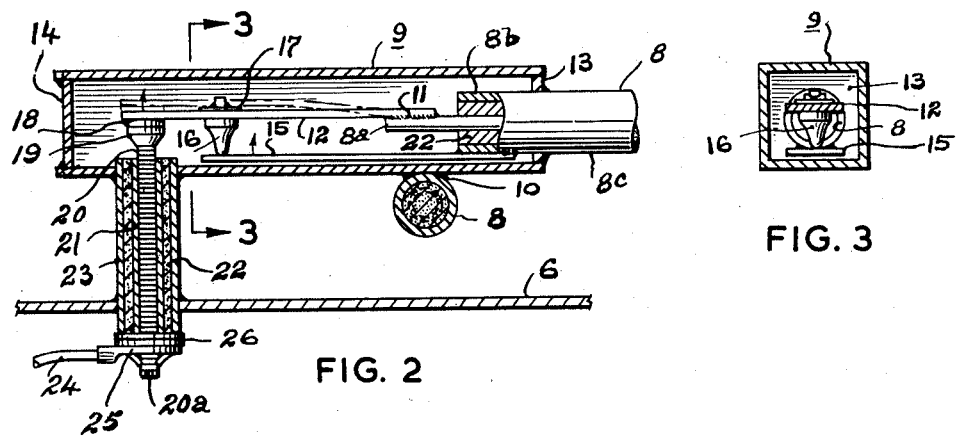
FIG. 2 is an enlarged fragmentary sectional elevation illustrating in particular the built-in thermostatic control unit of the invention.
FIG. 3 is a cross-sectional view of the thermostatic control unit, taken on the line 3—3 of FIG. 2.

According to the invention proper, therefore, the thermostatic control is not mounted in conventional fashion under the base 6 of vessel 1, but instead is mounted in a sealed housing 9 forming a unitary portion of the heating element assembly 8, as evident from FIGS. 1 and 2 of the drawings. Moreover the sealed thermostat housing 9 is seen to be of relatively small volume whereby any air entrapped therein during manufacture will contain insufficient moisture to cause appreciable corrosion even at elevated temperatures.

Preferably thermostat housing 9 is of the slab-sided construction best shown in FIG. 2, to facilitate fabrication by automated welding techniques or similar automatic machinery, although recourse may be had to any other suitable housing shape as desired. Such slab-sided construction also provides an adequate surface whereby housing 9 may be welded to an intermediate section 10 of the Calrod as best seen in FIG. 2 whereby the rigidity of the entire heating element assembly may be substantially enhanced, as well as improving the thermal conduction between Calrod element 8 and thermostat housing 9.

One end 8c of the heating element assembly extends into thermostat housing 9, the central conductor 8a of the Calrod preferably being welded at 11 to the bimetal 12 located within said housing 9 as shown. The end 8c extends through a closure plate 13 of housing 9 and is rigidly attached thereto, preferably by welding of the Calrod sheath 8b to said plate 13. A similar closure plate 14 is used to seal the remaining end of housing 9 as shown in FIG. 2. A strip 15 of spring steel is also attached to the sheath 8b of end 8c of the Calrod 8 as by welding thereto. Spring strip 15 may be of ordinary high carbon steel or stainless steel and is employed to bias the bimetal 12 in an upward direction in FIG. 2. This upward bias is applied to bimetal 12 through an electrically insulative spacer bead 16 of any suitable dielectric medium such as plastic, glass or porcelain. Bead 16 is attached to bimetal 12 in normal manner as by a lock-type fastener 17 or by an upsetting process. The bimetal 12 is arranged to carry the movable contact 18 in normal manner and the stationary contact 19 for cooperation therewith is arranged to form the head of an adjusting screw 20. Screw 20 is slotted at end 20a whereby it may be rotated within threaded tube 21. Hence by applying a screwdriver to slot 20a it is possible to advance screw 20 along threaded tube 21 and thus provide a fine adjustment of the relatively coarse bias being applied to bimetal 12 by the bias spring 15. The threaded tube 21 is enveloped in an electrically insulative medium 22 which may be similar to that employed to space the central conductor 8a of the Calrod element from the sheath 8b thereof. Compacted granular magnesium oxide, preferably sintered, has been advantageously employed as the dielectric 22. The entire assembly comprising set-screw 20, tube 21 and dielectric 22 is encased in a relatively stout pillar 23 which extends into thermostat housing 9 and is rigidly attached thereto as by welding. Pillar 23 also extends through the base 6 of the water compartment 5 of the vessel 1, and is similarly welded to ensure a rigid and watertight seal with base 6 as shown. Leads 24 extend into false bottom 7 from the input terminals 4 as previously mentioned, and may be attached to the stationary contact carrier-screw 20 as by a press-on lug 25. Insulative washers 26 of mica or other temperature-stable substance are provided to maintain electrical isolation of pillar 23 from threaded tube 21 and set-screw 20.

The remaining end 27 of the Calrod element 8 is brought out through base 6 of water compartment 5 of vessel 1 closely adjacent to pillar 23 as shown in FIG. 1. This close proximity of pillar 23 and Calrod end 27 is made possible by the "butterfly" configuration of immersion heating element 8 and allows welding of pillar 23 and Calrod end 27 to the base 6 to be performed simultaneously by a single welding head during manufacture, thus facilitating and expediting the assembly.

It will be apparent that by resorting to a relatively stout pillar 23, and moreover by welding housing 9 to an intermediate section 10 of the Calrod element 8, an exceptionally robust mounting of the "butterfly" element to the kettle base 6 is obtained. Although the "butterfly" element has been shown in FIG. 1 as having a letter S configuration employing only one weld at 10 it will be obvious that such "butterfly" element may also involve a figure 8 configuration employing a second weld closing the remaining loop 28 of the Calrod 8 for increased rigidity in large installations such as domestic water boilers.

It will also be noted that the construction of FIG. 1 provides for excellent heat-transfer between the Calrod type heating element 8 and the surrounding water, due to the fact that heat may be transmitted to the water from all sides of the "butterfly" element, rather than from only the top surface of the heating element as occurs with conventional structure wherein the heating element is embedded in base 6.

Moreover by welding of the thermostat housing 9 to an intermediate section 10 of the Calrod 8 the thermostatic control is made responsive to both the heating element and the ambient water temperatures, so that should the kettle accidentally boil dry the resulting rise in temperature of the heating element will rapidly cause the thermostatic bimetal to cut off the power supply, thus saving the kettle from probable damage. With the construction of FIG. 1, it has been found possible to achieve at least a 15% reduction over the response lag of the normal thermostatic control to "boil-dry" conditions in conventional kettle installations.

A further advantage of the instant invention will be evident from FIGS. 1 and 2 wherein the thermostatic control housing 9 is seen to be only as large as is necessary to ensure capture of end 8c of the Calrod and allow the requisite motion of the movable contact 18. Thus a minimal volume of air is capable of entrapment within housing 9 during the necessary fabrication operations thereof, and hence a minimum amount of moisture is present within housing 9 whereby the amount of corrosion damage which can be caused is rigorously limited. Moreover the necessary leakproofing of housing 9 (due to complete immersion thereof in water) automatically ensures sealing thereof against entry of further air. There is, therefore, no continual replenishment of any humid air present adjacent the bimetal as unfortunately occurs within the false bottom of contemporary kettle constructions. Essentially because of the relative immunity to deterioration conferred on the thermostatic control by enclosure thereof within hermetically sealed housing 9, it becomes possible to connect the setting of the bimetal only once during assembly (by rotating screw 20 with a screwdriver in slot 20a) and thereafter no further readjustment of the thermostatic control is ever necessary.

It will, therefore, be evident that this invention provides a readily manufactured electrical heating element assembly with built-in thermostatic control of a novel design which employs a minimum of component parts, yet enables rapid response to temperature fluctuations whereby it is particularly suited for use as an immersion heating element in domestic appliances such as percolators, kettles, water boilers and the like.

While the invention has been illustrated and described with reference to a particular physical arrangement it will be appreciated that equivalent constructions will suggest themselves to those skilled in such matters. It is, therefore, the intention to cover in the appended claims all such equivalencies and modifications as do not depart from the spirit and scope of the invention as outlined herein.

What I claim is:

1. In a vessel for heating a fluid to a predetermined temperature including a fluid compartment having a base, a pair of input-terminals for connection to a source of current, and an elongated resistance-heating element disposed within said fluid compartment in spaced overlying relation to said base, the improvement wherein said heating element includes one end extending transversely through said base and operatively connected to one of said input-terminals, the other end of said heating element including in series therewith thermostatic switch means operatively connected to said other input-terminal, said thermostatic switch means comprising an elongated housing sealingly connected to, enclosing and extending longitudinally from the other end of said resistance heating element, said housing including a support tube depending transversely therefrom and sealingly connected to said fluid compartment base, a threaded contact adjustably supported in said tube in insulated relationship therefrom and including a contact end portion disposed within said housing and another end portion extending through said tube and connected to said other input-terminal below said base, a second contact comprising a bimetallic element electrically connected at one end to said heating element within said housing and having another end normally engaged with said end portion of said first mentioned contact for forming a closed circuit therebetween.

2. The structure as claimed in claim 1 in which said elongated resistance heating element and elongated housing are spaced above said base and include an intermediate loop portion extending beneath said housing and fixedly secured thereto for providing a heat source substantially adjacent one end of said bimetallic element for providing an immediate opening of the circuit between said contacts due to a predetermined temperature.

3. The structure as claimed in claim 1 in which said switch means comprises an elongated leaf spring extending substantially parallel to said bimetallic element and fixedly secured at one end within said housing, said bimetallic element including an abutment element of an electrical-insulating material and engaged with said leaf spring element, said leaf spring element normally biasing said bimetallic element in the direction for opening the circuit between said contacts for affording a snap action in the presence of a predetermined temperature.

4. The structure as claimed in claim 3 in which said elongated resistance heating element and elongated housing are spaced above said base and include an intermediate loop portion extending beneath said housing and fixedly secured thereto for providing a heat source substantially adjacent one end of said bimetallic element for providing an immediate opening of the circuit between said contacts due to a predetermined temperature.

References Cited in the file of this patent

FOREIGN PATENTS

| | | |
|---|---|---|
| 474,867 | Canada | June 26, 1951 |
| 562,997 | Great Britain | July 25, 1944 |
| 593,741 | Great Britain | Oct. 24, 1947 |
| 699,245 | Great Britain | Nov. 4, 1953 |
| 752,468 | Great Britain | July 11, 1956 |
| 821,024 | Great Britain | Sept. 30, 1959 |
| 851,316 | Great Britain | Oct. 12, 1960 |